United States Patent
Ding (10) Patent No.: US 12,386,588 B2
(45) Date of Patent: Aug. 12, 2025

(54) COMMUNICATION CHIP AND DATA PROCESSING METHOD

(71) Applicant: SANECHIPS TECHNOLOGY CO., LTD., Shenzhen (CN)

(72) Inventor: Ruixiang Ding, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 237 days.

(21) Appl. No.: 18/312,864

(22) Filed: May 5, 2023

(65) Prior Publication Data

US 2023/0273767 A1  Aug. 31, 2023

Related U.S. Application Data

(63) Continuation of application No. PCT/CN2021/128824, filed on Nov. 4, 2021.

(30) Foreign Application Priority Data

Nov. 6, 2020 (CN) .......................... 202011233275.1

(51) Int. Cl.
  *G06F 5/12* (2006.01)
  *G06F 5/06* (2006.01)
  *G06F 13/16* (2006.01)

(52) U.S. Cl.
  CPC .............. *G06F 5/12* (2013.01); *G06F 5/065* (2013.01); *G06F 13/1673* (2013.01)

(58) Field of Classification Search
  CPC ................................................ G06F 13/1673
  See application file for complete search history.

(56) References Cited

U.S. PATENT DOCUMENTS 5,812,335 A * 9/1998 Kool ...................... G11B 5/596
6,665,308 B1 * 12/2003 Rakib ................... H04L 27/362
                                                          370/479

(Continued)

FOREIGN PATENT DOCUMENTS

CN          1658596 A        8/2005
CN        102394823 A        3/2012

(Continued)

OTHER PUBLICATIONS

First Office Action in Corresponding Japanese Application No. 2023-526632, dated Apr. 16, 2024; 8 pgs.

(Continued)

*Primary Examiner* — Henry Tsai
*Assistant Examiner* — Aurangzeb Hassan
(74) *Attorney, Agent, or Firm* — HAUPTMAN HAM, LLP (57) ABSTRACT

Embodiments of the present application provide a communication chip and a data processing method. The communication chip includes a plurality of synchronization modules, a set of buffer modules, and a plurality of alignment modules. The synchronization module is configured to receive data of a corresponding channel, synchronize the received data, and store the synchronized data into the buffer module; the buffer module includes a plurality of first-in-first-out queues FIFO, and the FIFO is configured to buffer the synchronized data output by the corresponding synchronization module; and the alignment module is configured to align the synchronized data of the corresponding channel in the buffer module, and combine and output the aligned data.

10 Claims, 7 Drawing Sheets

(56) References Cited

U.S. PATENT DOCUMENTS

| | | |
|---|---|---|
| 6,990,538 B2 | 1/2006 | Rojas et al. |
| 9,564,990 B1 | 2/2017 | Tiruvur et al. |
| 9,940,288 B1 | 4/2018 | Reiss et al. |
| 10,009,200 B2 | 6/2018 | Tiruvur et al. |
| 10,009,214 B1* | 6/2018 | Farhoodfar ............ H04W 28/04 |
| 2005/0188146 A1 | 8/2005 | Teo |
| 2008/0019466 A1* | 1/2008 | Limberg ............ H03M 13/2732 375/346 |
| 2014/0189459 A1 | 7/2014 | Vijayaraghavan et al. |
| 2018/0076925 A1* | 3/2018 | Neal ..................... H04L 1/0041 |
| 2019/0273571 A1* | 9/2019 | Bordogna ............ H04J 3/0661 |

FOREIGN PATENT DOCUMENTS

| | | |
|---|---|---|
| CN | 102820964 A | 12/2012 |
| CN | 108809861 A | 11/2018 |
| CN | 109302257 A | 2/2019 |
| CN | 111800109 A | 10/2020 |
| JP | 2000253852 A | 9/2000 |
| JP | 2006253852 A | 9/2006 |
| JP | 2016046589 A | 4/2016 |

OTHER PUBLICATIONS

First Office Action issued in Chinese Patent Application No. 202011233275.1; mailed Apr. 4, 2024; 16 pgs.

Communication of and European Search Report issued in European Application No. 21888637.2; mailed Apr. 4, 2024; 11 pgs.

Miao, Peng, et al; "10Gbit/s Very Short Reach Parallel Optical Transmission Module and System"; Acta Electronica Sinica; vol. 35, No. 2; Feb. 2007; 4 pgs.

Ranjula W.P., R.M.A.U. Senarath, et al; "Implementation Techniques for IEEE 802.3ba 40Gbps Ethernet Physical Coding Sublayer (PCS)"; IEEE, Jun. 24, 2015; pp. 1-5.

International Search Report in Corresponding International Application No. PCT/CN2021/128824, mailed Jan. 26, 2022; 11 pgs.

* cited by examiner

COMMUNICATION CHIP AND DATA PROCESSING METHOD

CROSS-REFERENCE TO RELATED APPLICATIONS

This application is a Continuation of International Application No. PCT/CN2021/128824, filed on Nov. 4, 2021, which claims priority to Chinese Patent Application No. 202011233275.1, filed on Nov. 6, 2020, the entire contents of which are incorporated herein by reference.

TECHNICAL FIELD

The present application relates to the technical field of communication, and in particular to a communication chip and a data processing method.

BACKGROUND

With the development of 5G communication technology, high-speed and high-quality data transmission has become an important issue that must be considered when designing the chip. When the required network rate exceeds the carrying capacity of physical devices, it is the general trend to implement multi-channel parallel transmission to realize high-speed interfaces.

In order to ensure the quality of data transmission, the physical coding sublayer (PCS) of the communication chip usually chooses the Reed-Solomon forward error correction (RS-FEC) coding method when the data is transmitted at a high rate. RS-FEC requires the sending side to insert an alignment mark (AM) into the data. After the data is transmitted through optical fiber or cable, the receiving side looks for AM in the data stream for data synchronization alignment.

SUMMARY

Embodiments of the present application provide a communication chip, including: a plurality of synchronization modules, a set of buffer modules, and a plurality of alignment modules, the synchronization module is configured to receive data of a corresponding channel, synchronize the received data, and store the synchronized data into the buffer module;

the buffer module includes a plurality of first-in-first-out queues FIFO, and the FIFO is configured to buffer the synchronized data output by the corresponding synchronization module; and the alignment module is configured to align the synchronized data of the corresponding channel in the buffer module, and combine and output the aligned data.

Embodiments of the present application provide a data processing method, applied to the communication chip provided by the present application, the method including:

receiving, by the synchronization module, the data of the corresponding channel, and synchronizing the received data, and storing the synchronized data into the buffer module;

buffering, by each first-in-first-out queue FIFO in the buffer module, the synchronized data output by the corresponding synchronization module; and aligning, by at least one alignment module among the plurality of alignment modules, the synchronized data of all channels in the buffer module, and combining and outputting the aligned data.

DETAILED DESCRIPTION OF THE EMBODIMENTS

In order to ensure the quality of data transmission, the physical coding sublayer (PCS) of the communication chip usually chooses the Reed-Solomon forward error correction (RS-FEC) coding method when the data is transmitted at a high rate. RS-FEC requires the sending side to insert an alignment mark (AM) into the data. After the data is transmitted through optical fiber or cable, the receiving side looks for AM in the data stream for data synchronization alignment.

The data synchronization alignment method received by the communication chip is not compatible with multiple protocols and rates, resulting in inflexible use of the communication chip, and greatly increasing the cost of research and development and use of the communication chip.

Embodiments of the present application provide a communication chip and a data processing method, which can realize the data alignment requirements of various rate configuration combinations, can reduce the occupation and waste of logic resources, and realize structural optimization.

Embodiments of the present application provide a technical solution, including: a plurality of synchronization modules, a set of buffer modules, and a plurality of alignment module. The set of buffer modules includes a plurality of FIFOs. The FIFO buffer corresponds to the synchronized data output by the synchronization module, aligns, by at least one alignment module, the synchronized data of all channels of at least one FIFO buffer in the buffer module, and combines and outputs. Data alignment requirements of various rate configuration combinations can be realized through the plurality of FIFOs, which can reduce the occupation and waste of logic resources and realize structural optimization.

Figure 1:
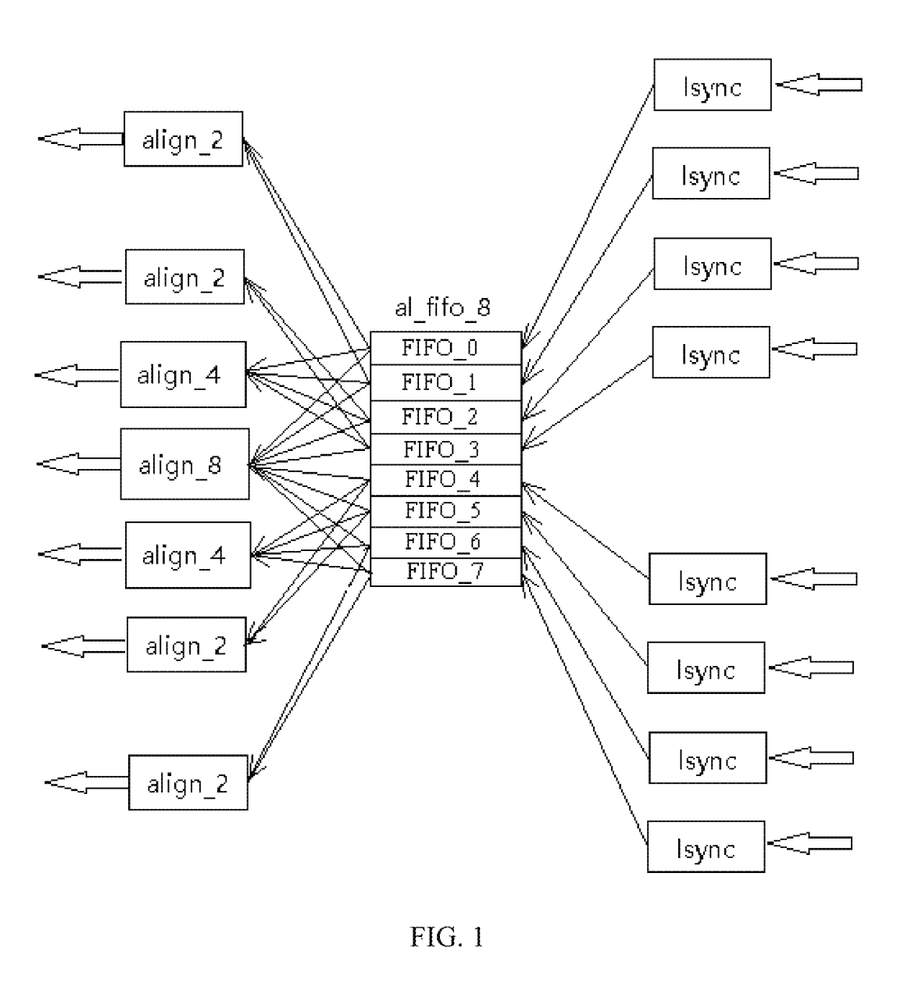
FIG. 1 is a schematic structural diagram of a communication chip according to an embodiment of the present application.

FIG. 1 is a schematic structural diagram of a communication chip according to an embodiment of the present application. The communication chip provided by the present application includes a physical coding sublayer (PCS), and supports an RS-FEC configuration environment.

As shown in FIG. 1, the communication chip provided by the present application includes a plurality of synchronization modules (lsync), a set of buffer modules (al_fifo_8) and a plurality of alignment modules (including align_2, align_4, and align_8).

The synchronization module is configured to receive data of a corresponding channel, synchronize the received data, and store the synchronized data into the buffer module. The buffer module includes a plurality of first-in-first-out queues FIFO, and the FIFO is configured to buffer the synchronized data output by the corresponding synchronization module. The alignment module is configured to align the synchronized data of the corresponding channel in the buffer module, and combine and output the aligned data. Combine and output refers to first combine and then output.

In an exemplary embodiment, the number of synchronization modules is 8, the number of alignment modules is 7, and the number of FIFOs is 8. As shown in FIG. 1, the buffer module (al_fifo_8) may include 8 FIFOs, namely FIFO_0, FIFO_1, FIFO_2, FIFO_3, FIFO_4, FIFO_5, FIFO_6, and FIFO_7. The synchronized data output by the plurality of synchronization modules are sequentially buffered into the FIFO, and the synchronization modules and the FIFOs can be in one-to-one correspondence.

It should be noted that the number of synchronization modules and the number of FIFOs can be the same, the number of synchronization modules and FIFOs can also be other numbers, which can be set according to actual needs, and the number of alignment modules can also be other numbers.

In an exemplary embodiment, data output rates of the plurality of alignment modules are not exactly the same. Specifically, the size of each output data supported by the plurality of alignment modules is not exactly the same, or the data supported by the plurality of alignment modules is not exactly the same.

In an exemplary embodiment, the plurality of alignment modules include four first alignment modules (align_2), two second alignment modules (align_4) and one third alignment module (align_8).

The first alignment module is configured to align the synchronized data of two channels corresponding to buffers of two FIFOs, and combine and output the synchronized data of the two channels.

The second alignment module is configured to align the synchronized data of four channels corresponding to buffers of four FIFOs, and combine and output the synchronized data of the four channels.

The third alignment module is configured to align the synchronized data of eight channels corresponding to buffers of eight FIFOs, and combine and output the synchronized data of the eight channels.

As shown in FIG. 1, the synchronization module (lsync) may be a single-channel synchronization module, or a synchronization state machine of a channel (lane) in a forward error correction FEC mode, and supports all Ethernet rates. The first alignment module (align_2) can be an alignment module of 2-channel data, can be an alignment state machine with a completion rate of 50GE (gigabit ethernet) and 2 FEC lanes, and can complete the merging function of data types (symbols) on the 2 FEC lanes. The second alignment module (align_4) can be an alignment module of 4-channel data, can be an alignment state machine with a completion rate of 100GE and 4 FEC lanes, and can complete the merging function of symbols on the 4 FEC lanes. The third alignment module (align_8) can be an alignment module of 8-channel data, can be an alignment state machine with a completion rate of 200GE and 8 FEC lanes, and can complete the merging function of symbols on 8 FEC lanes.

In some embodiments of the present application, the data source may be output data encoded by RS-FEC from the sending side of the PCS, and data that has been divided into N channels (can be 1-8) according to different FCE lanes, that is, data on N channels. If the data transmission rate is 25GE, it contains the data of 1 FEC lane; if the data transmission rate is 50GE, it contains the data of 2 FEC lanes. If the rate of the data transmission is 100GE, it includes the data of 4 FEC lanes; if the data transmission rate is 200GE, it includes the data of 8 FEC lanes.

The data processing process of the communication chip provided by the present application is as follows.

As shown in FIG. 1, the synchronization module performs data synchronization: the data on the input N channels, that is, the input N-channel data passes through the corresponding synchronization module to complete the single-FEC lane synchronization process of the N-channel data. The synchronization process is to use the alignment mark (AM) generated in the PCS protocol at a fixed period when sending and carried in the PCS processing data stream, query the alignment mark in the data, remove the data before the alignment mark, and use the alignment mark as the boundary of the transmitted data. For details, please refer to IEEE 802.3-2018 clause 82, 91, 108, 119, 134 and other chapters. After the synchronization module synchronizes the data of the corresponding channel, it outputs a synchronization signal (carrying synchronization state information) and a channel identifier (FEC lane number) to the alignment module corresponding to the configuration rate, and sends the synchronized data to the buffer module.

Buffer module de-skew: the buffer module includes 8 FIFOs, and the data synchronized by N (can be 8) FEC lanes is directly written into the corresponding FIFOs. The read and clear operations in each FIFO can be controlled by a downstream alignment module (first alignment module, second alignment module or third alignment module).

The alignment module performs data alignment: according to the configuration rate of the port, the first alignment module (align_2), the second alignment module (align_4) or the third alignment module (align_8) realizes the alignment of multiple FEC lane data by controlling the upstream FIFO read and clear operations. Specifically, when the N FIFOs in the buffer module have buffered the data synchronized with all channels corresponding to the configuration rate, a notification message is sent to the alignment module, the alignment module receives the notification message and the corresponding synchronization state information, and simultaneously reads the synchronized data in the N FIFOs to achieve data alignment, and sorts the data according to the channel identifiers before outputting. The first alignment module (align_2) completes data alignment at a rate of 50GE, the second alignment module (align_4) completes data alignment at a rate of 100GE, and the third alignment module (align_8) completes data alignment at a rate of 200GE. The configuration rate of a port can be understood as the supported rate configured on the port.

It should be noted that the communication chip provided by the present application is not limited to the structural form shown in FIG. 1. The number of FIFOs in the synchronization module and the buffer module, and the number of alignment modules can be adjusted according to actual needs.

The communication chip provided by the present application can complete the synchronization and alignment operation of data from the physical media attachment (PMA), can support multiple rate configuration methods, and can support the configuration and combination of external network and CPRI multiple rates, thus presenting a variety of port support rate configuration methods, for example, it can support 4 25GE rates, or 4 50GE rates, either support 4 Common Public Radio Interface (CPRI) ports, or support 2 100GE rate ports, or support 1 rate 100GE and 2 25GE/50GE/CPRI ports, or support 1 rate 200GE port.

The communication chip provided by the present application can include a plurality of synchronization modules, a set of buffer modules, and a plurality of alignment modules. The set of buffer modules includes a plurality of FIFOs, and the FIFO buffer corresponds to the synchronized data output by the synchronization module, and at least one alignment module aligns the synchronized data of all channels of at least one FIFO buffer in the buffer module, and combines and outputs. Data alignment requirements of various rate configuration combinations can be realized through multiple FIFOs, which can reduce the occupation and waste of logic resources and realize structural optimization. In an embodiment, the buffer module includes 8 FIFOs, through which the data alignment requirements of various rate configuration combinations can be realized. If the communication chip provided by the present application is not applicable, 24 FIFOs are needed to realize the same function, thereby reducing the occupation and waste of logic resources, optimizing the chip, and reducing the cost.

Figure 2:
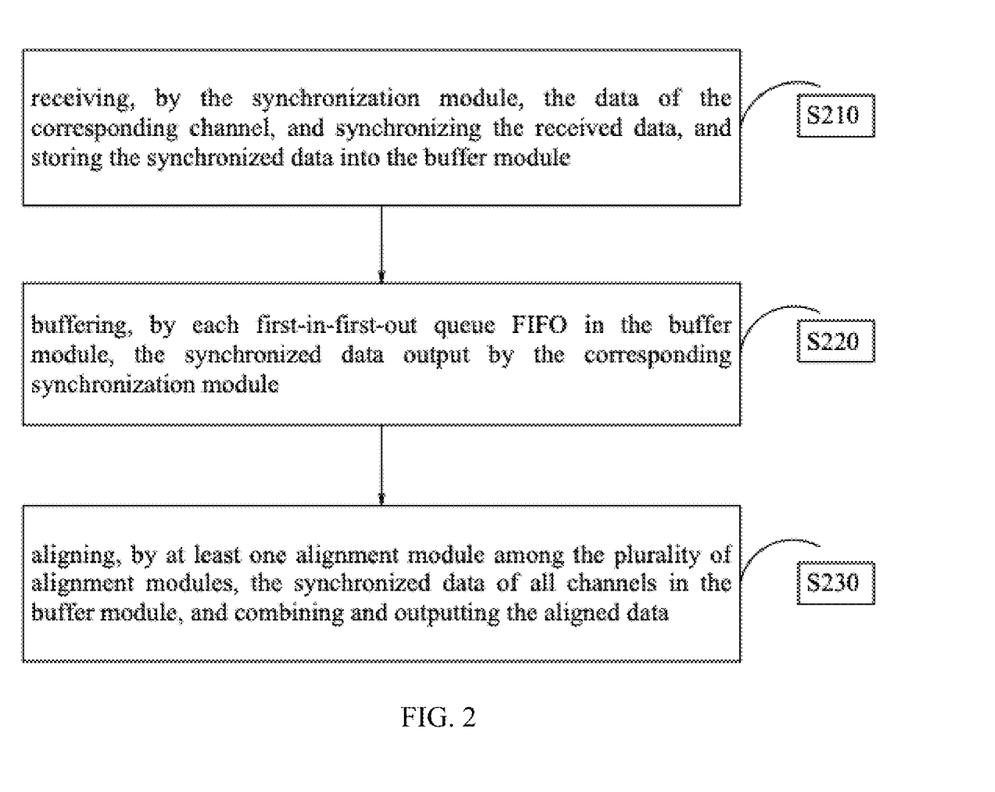
FIG. 2 is a flowchart of a data processing method according to an embodiment of the present application.

FIG. 2 is a data processing method according to an embodiment of the present application, the method is applied to the communication chip provided by the present application. The chip can be a chip that includes a PCS, as shown in FIG. 2, the technical solutions provided by the embodiments of the present application include:

S210, receiving, by the synchronization module, the data of the corresponding channel, and synchronizing the received data, and storing the synchronized data into the buffer module.

S220, buffering, by each first-in-first-out queue FIFO in the buffer module, the synchronized data output by the corresponding synchronization module.

S230, aligning, by at least one alignment module among the plurality of alignment modules, the synchronized data of all channels in the buffer module, and combining and outputting the aligned data.

For the specific data communication method, please refer to the method of communicating through the communication chip.

In an exemplary embodiment, data rates of the plurality of alignment modules are not exactly the same.

In an exemplary embodiment, the number of the synchronization modules is 8, the number of the alignment modules is 7, and the number of the FIFOs is 8.

In an exemplary embodiment, the method further includes: sending, by the synchronization module, synchronization state information and a channel identifier to the alignment module corresponding to a configuration rate; and in response to that the buffer module buffers the data synchronized with all channels corresponding to the configuration rate, sending a notification message to the alignment module corresponding to the configuration rate.

The aligning the synchronized data of all channels in the buffer module, and combining and outputting the aligned data includes: in response to receiving the synchronization state information and the notification message, reading the synchronized data of the corresponding channel buffered by the FIFO in the buffer module, and arranging and outputting the read data based on the channel identifier.

The data on each channel can be sent by the PCS sending side at the same time. Since the physical media that each channel may pass through during data transmission is different, there will be delays in receiving data on some channels. In order to realize the data alignment of each channel, the synchronization module synchronizes the data of the corresponding channel and buffers it in the corresponding FIFO in the buffer module. When the synchronized data of all channels are buffered in the corresponding FIFO, the alignment module reads the data in the non-empty FIFO at the same time to realize data alignment.

Specifically, when the alignment module receives the synchronization state information, it can be judged that the received data has been synchronized. When the alignment module receives the notification message, it can be judged that the buffer module has buffered the synchronized data of all channels corresponding to the configuration rate. Therefore, when the alignment module receives the synchronization state information and the notification message, it reads the non-empty FIFO in the buffer module at the same time, to realize the alignment of all channel data, and arrange the read data according to the channel identifier, so that the output data is output in the order in which the data is sent.

In an exemplary embodiment, the method further includes: in response to that a time skew between the synchronized data of every two channels exceeds a set range, emptying, by the alignment module, the FIFO in the buffer module, and returning, by each synchronization module, the operation of receiving the data of the corresponding channel, synchronizing the received data, and storing the synchronized data into the buffer module.

The time skew can refer to the interval between times, and the set range can be set according to the actual situation. When the time skew between the synchronized data of each two channels exceeds the set range, the FIFO overflows and the data alignment fails. It is necessary to reset the non-empty FIFO and restart the synchronization alignment process.

In some embodiments of the present application, the specific data processing method can refer to a processing method through a communication chip.

As shown in FIG. 1, the synchronization module performs data synchronization: the data on the input N channels, that is, the input N-channel data passes through the corresponding synchronization module to complete the single-FEC lane synchronization process of the N-channel data. The synchronization process is to use the alignment mark (AM) generated in the PCS protocol at a fixed period when sending and carried in the PCS processing data stream, query the alignment mark in the data, remove the data before the alignment mark, and use the alignment mark as the boundary of the transmitted data. For details, please refer to IEEE 802.3-2018 clause 82, 91, 108, 119, 134 and other chapters. After the synchronization module synchronizes the data of the corresponding channel, it outputs a synchronization signal (carrying synchronization state information) and a channel identifier (FEC lane number) to the alignment module corresponding to the configuration rate, and sends the synchronized data to the buffer module.

Buffer module de-skew: the buffer module includes 8 FIFOs, and the data synchronized by N (can be 8) FEC lanes is directly written into the corresponding FIFOs. The read and clear operations in each FIFO can be controlled by a downstream alignment module (first alignment module, second alignment module or third alignment module).

The alignment module performs data alignment: according to the configuration rate of the port, the first alignment module (align_2), the second alignment module (align_4) or the third alignment module (align_8) realizes the alignment of multiple FEC lane data by controlling the upstream FIFO read and clear operations. Specifically, when the N FIFOs in the buffer module have buffered the data synchronized with all channels corresponding to the configuration rate, a notification message is sent to the alignment module, the alignment module receives the notification message and the corresponding synchronization state information, and simultaneously reads the synchronized data in the N FIFOs to achieve data alignment, and sorts the data according to the channel identifiers before outputting. The first alignment module (align_2) completes data alignment at a rate of 50GE, the second alignment module (align_4) completes data alignment at a rate of 100GE, and the third alignment module (align_8) completes data alignment at a rate of 200GE. The configuration rate of a port can be understood as the supported rate configured on the port.

As shown in FIG. 1, the third alignment module (align_8) is taken as an example, the specific operation of data alignment is as follows:

Step 1: After reset, the third alignment module (align_8) clears the 8 FIFOs in the buffer module (al_fifo_8);

Step 2: When a certain channel (when the number is less than 8) is synchronized, the corresponding FIFO can only be written but not read;

Step 3: When the 8 channels are all synchronized and the 8 FIFOs are not empty, the buffer module (al_fifo_8) starts to read the synchronized data in the 8 FIFOs at the same time, and the first read is AM;

Step 4: When any FIFO overflows, it means that the time skew between channels exceeds the allowable range, and the alignment fails. At this time, the third alignment module (align_8) resets all 8 FIFOs and restarts the synchronous alignment process.

Step 5: After the alignment is successful, rearrange the 8-channel input data in sequence according to the FEC lane number given by the synchronization module and output it.

The alignment process of the first alignment module (align_2) and the second alignment module (align_4) is similar to that of the third alignment module (align_8). The difference is that the first alignment module (align_2) inputs data from the corresponding 2 FIFOs and controls the read and clear operations of these 2 FIFOs, the second alignment module (align_4) inputs data from the corresponding 4 FIFOs and controls the read and clear operations of the 4 FIFOs.

Figure 3:
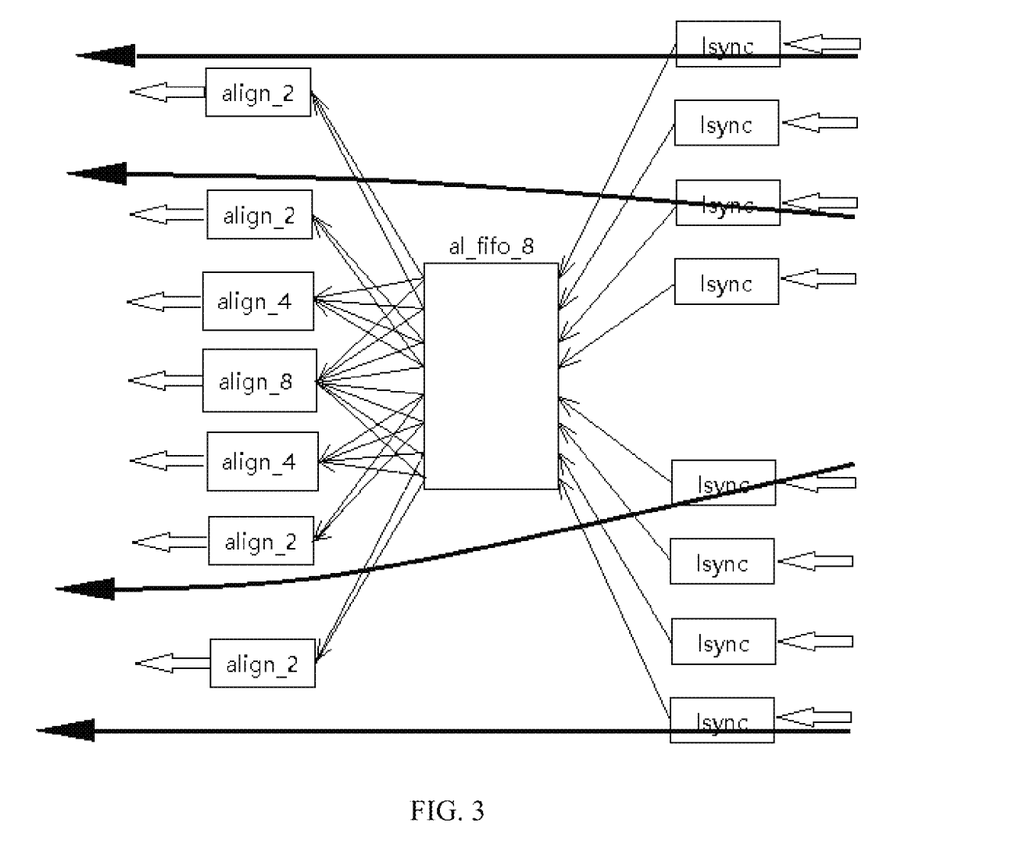
FIG. 3 is a first schematic diagram of data flow at a configuration rate according to an embodiment of the present application.

In an exemplary embodiment, in response to that the configuration rate is a data rate of one channel, the data of the corresponding channel is received by each of the synchronization modules, the received data is synchronized, and the synchronized data is sent to a downstream receiving side. As shown in FIG. 3, the data rate of a channel is 25GE, and the configuration rate includes 4 25GE. The data on the 4 channels is received through the 4 synchronization modules, and the received data is synchronized, and the synchronized data is sent to the downstream receiving side, that is, the synchronized data does not pass through the buffer module and the alignment module. The reason is: since the configuration rate is the same as the data rate of one channel, there is no need to combine and output the synchronized data of at least two channels, so the data output by the synchronization module can be directly sent to the downstream receiving side.

In an exemplary embodiment, in response to that the configuration rate is a sum of data rates of two channels, and the plurality of alignment modules receive the data of eight channels, the aligning, by at least one alignment module among the plurality of alignment modules, the synchronized data of all channels in the buffer module, and combining and outputting the aligned data includes:

aligning, by the four first alignment modules, the synchronized data of eight channels corresponding to buffers of eight FIFOs in the buffer module, and combining and outputting the aligned data; wherein each first alignment module is configured to align the synchronized data of two channels corresponding to buffers of two FIFOs in the buffer module, and combine and output the synchronized data of the two channels.

Figure 4:
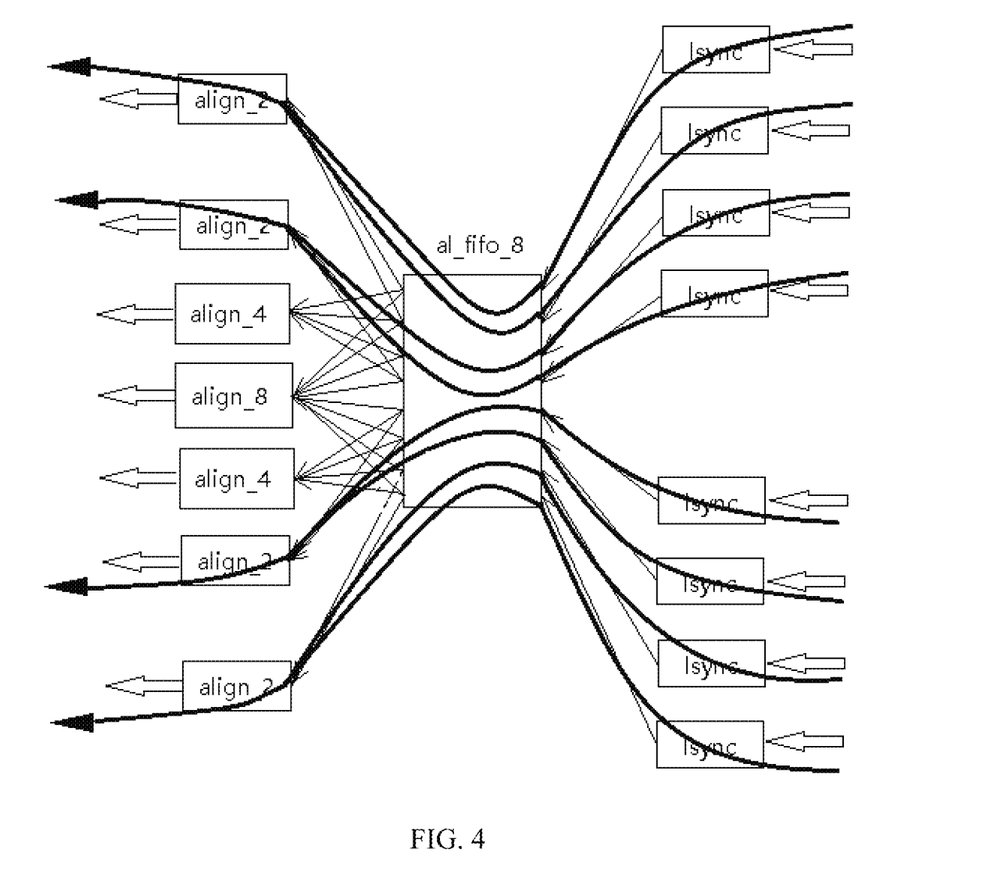
FIG. 4 is a second schematic diagram of data flow at a configuration rate according to an embodiment of the present application.

As shown in FIG. 4, the data rate of one channel is 25GE, and the configuration rate includes: 4 50GE. The data on 8 channels is received through 8 synchronization modules (lsync), and the received data is synchronized, and the synchronized data is buffered into the corresponding 8 FIFOs. The synchronized data buffered in the 8 FIFOs is aligned through four first alignment modules (align_2), and the aligned data is combined and output. Each first alignment module (align_2) aligns the synchronized data buffered in the two FIFOs, and combines and outputs them.

In an exemplary embodiment, in response to that the configuration rate is a sum of data rates of four channels, and the plurality of alignment modules receive the data of eight channels, the aligning, by at least one alignment module among the plurality of alignment modules, the synchronized data of all channels in the buffer module, and combining and outputting the aligned data includes:

aligning, by the two second alignment modules, the synchronized data of eight channels corresponding to buffers of eight FIFOs in the buffer module, and combining and outputting the aligned data; wherein each second alignment module is configured to align the synchronized data of four channels corresponding to buffers of four FIFOs in the buffer module, and combine and output the synchronized data of the four channels.

Figure 5:
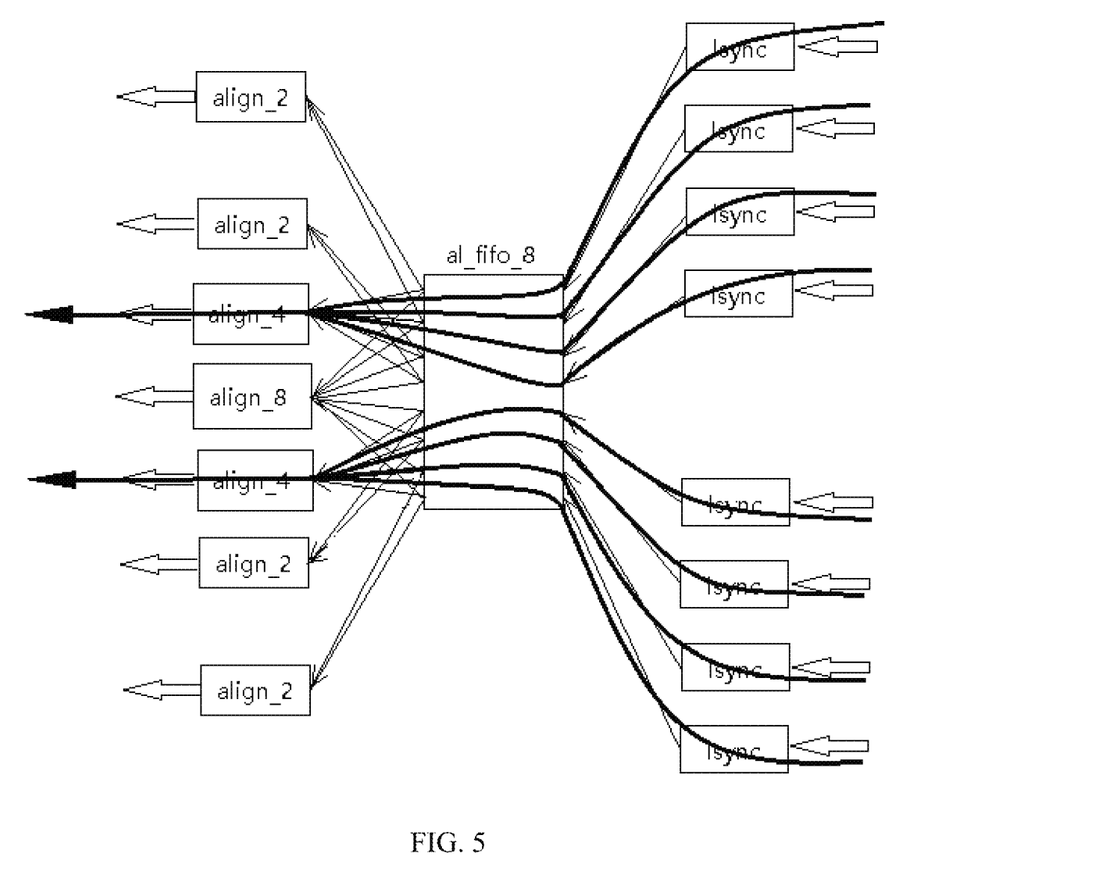
FIG. 5 is a third schematic diagram of data flow at a configuration rate according to an embodiment of the present application.

As shown in FIG. 5, the data rate of one channel is 25GE, and the configuration rate includes: 2 100GE. The data on 8 channels is received through 8 synchronization modules (lsync), and the received data is synchronized, and the synchronized data is buffered into the corresponding 8 FIFOs. The synchronized data buffered in the 8 FIFOs is aligned through two second alignment modules (align_4), and the aligned data is combined and output. Each second alignment module (align_4) aligns the synchronized data of the two channels buffered in the four FIFOs, and combines and outputs them.

In an exemplary embodiment, in response to that the configuration rate includes a sum of data rates of four channels, and data rates of two channels, and the plurality of alignment modules receive the data of eight channels, the aligning, by at least one alignment module among the plurality of alignment modules, the synchronized data of all channels in the buffer module, and combining and outputting the aligned data includes: aligning, by one second alignment module, the synchronized data of the four channels corresponding to buffers of 4 FIFOs in the buffer module, aligning, by the two first alignment modules, the synchronized data of the four channels corresponding to buffers of the other 4 FIFOs in the buffer module, and combining and outputting the synchronized data.

Figure 6:
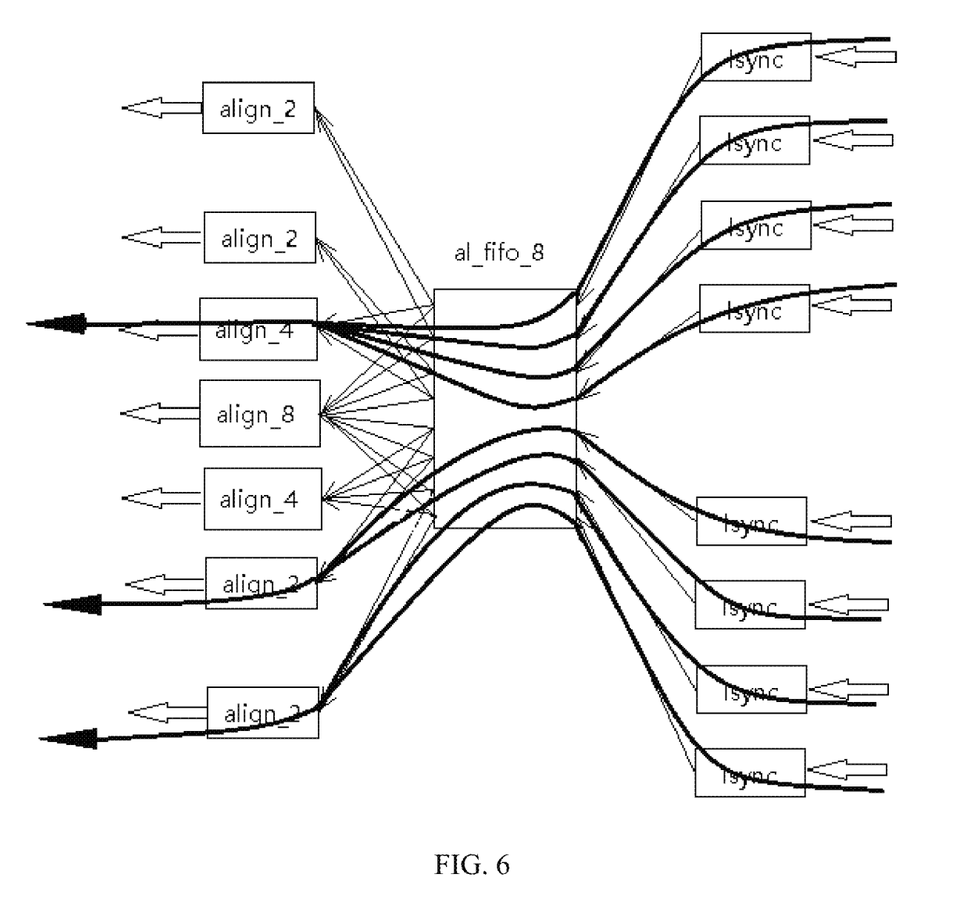
FIG. 6 is a fourth schematic diagram of data flow at a configuration rate according to an embodiment of the present application.

As shown in FIG. 6, the data rate of one channel is 25GE, and the configuration rate includes 1 100GE and 2 50GE. The data on 8 channels is received through 8 synchronization modules (lsync), and the received data is synchronize, and the synchronized data is buffered into the corresponding 8 FIFOs. The synchronized data of the 4 channels buffered in the 4 FIFOs is aligned through a second alignment module (align_4), and the synchronized data of the 4 channels in the 4 FIFOs are combined and output. The synchronized data of the 4 channels buffered in the other 4 FIFOs is aligned through the two first alignment modules (align_2), and the synchronized data of the four channels in the other 4 FIFOs are combined and output.

In an exemplary embodiment, in response to that the configuration rate is a sum of data rates of eight channels, and the plurality of alignment modules receive the data of eight channels, the aligning, by at least one alignment module among the plurality of alignment modules, the synchronized data of all channels in the buffer module, and combining and outputting the aligned data comprises:

aligning, by the third alignment module, the synchronized data of eight channels corresponding to buffers of eight FIFOs in the buffer module, and combining and outputting the synchronized data of the eight channels; the third alignment module is configured to align the synchronized data of the eight channels corresponding to the buffers of the eight FIFOs in the buffer module, and combine and output the synchronized data of the eight channels.

Figure 7:
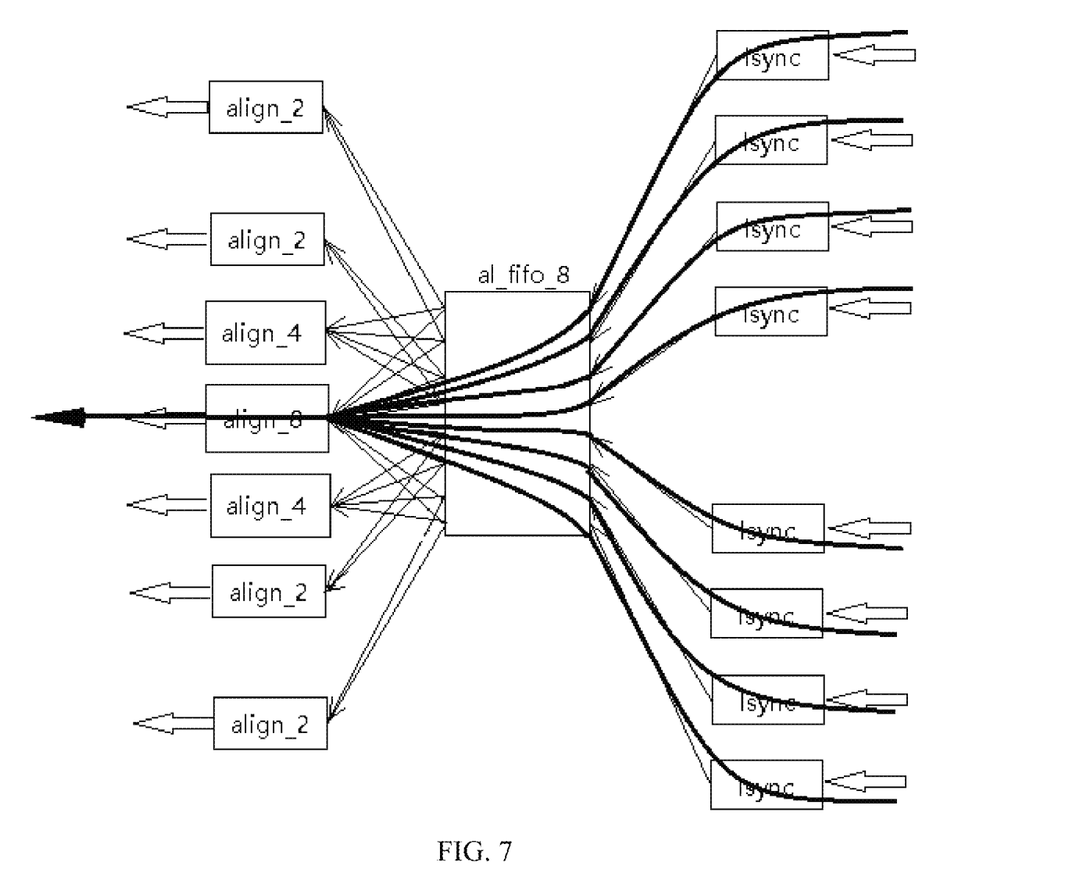
FIG. 7 is a fifth schematic diagram of data flow at a configuration rate according to an embodiment of the present application.

As shown in FIG. 7, the data rate of a channel is 25GE, and the configuration rate includes 1 200GE. The data on 8 channels is received through 8 synchronization modules (lsync), and the received data is synchronized, and the synchronized data is buffered into the corresponding 8 FIFOs. The synchronized data of the 8 channels buffered in the 8 FIFOs is aligned through a third alignment module (align_8), and the synchronized data of the 8 channels buffered in the 8 FIFOs are combined and output.

It should be noted that in FIG. 1 and FIG. 2 to FIG. 7, the flow direction of the arrow is the flow direction of data, and in FIG. 2 to FIG. 7, the flow direction of the curve with the arrow is the real data flow direction under different configuration rates.

The technical solution provided by the present application can support the configuration and combination of various Ethernet rates. The communication chip only contains a set of buffer modules, and the buffer module can include 8 FIFOs. During the process of data processing, the communication chip can be flexibly configured and used, and circuit logic resources can be saved, and the area and power consumption of the communication chip can be reduced.

What is claimed is:

1. A communication chip, comprising:
a plurality of synchronization modules;
a set of buffer modules; and
a plurality of alignment modules,
wherein the synchronization module is configured to receive data of a corresponding channel, synchronize the received data, and store the synchronized data into the buffer module;
the buffer module comprises a plurality of first-in-first-out queues FIFO, and the FIFO is configured to buffer the synchronized data output by the corresponding synchronization module;
the alignment module is configured to align the synchronized data of the corresponding channel in the buffer module, and combine and output the aligned data;
a number of the synchronization modules is 8, a number of the alignment modules is 7, and a number of the FIFOs is 8;
the plurality of alignment modules comprise four first alignment modules, two second alignment modules and one third alignment module;
each first alignment module is configured to align the synchronized data of two channels corresponding to buffers of two FIFOs, and combine and output the synchronized data of the two channels;
each second alignment module is configured to align the synchronized data of four channels corresponding to buffers of four FIFOs, and combine and output the synchronized data of the four channels; and
the third alignment module is configured to align the synchronized data of eight channels corresponding to buffers of eight FIFOs, and combine and output the synchronized data of the eight channels.

2. The communication chip according to claim 1, wherein the plurality of alignment modules output data at different rates.

3. A data processing method, applied to the communication chip according to claim 1, comprising:
receiving, by the synchronization module, the data of the corresponding channel, and synchronizing the received data, and storing the synchronized data into the buffer module;
buffering, by each first-in-first-out queue FIFO in the buffer module, the synchronized data output by the corresponding synchronization module; and
aligning, by at least one alignment module among the plurality of alignment modules, the synchronized data of all channels in the buffer module, and combining and outputting the aligned data.

4. The method according to claim 3, further comprising:
sending, by the synchronization module, synchronization state information and a channel identifier to the alignment module corresponding to a configuration rate; and
in response to that the buffer module buffers the data synchronized with all channels corresponding to the configuration rate, sending a notification message to the alignment module corresponding to the configuration rate;
wherein the aligning the synchronized data of all channels in the buffer module, and combining and outputting the aligned data comprises:
in response to receiving the synchronization state information and the notification message, reading the synchronized data of the corresponding channel buffered by the FIFO in the buffer module, and arranging and outputting the read data based on the channel identifier.

5. The method according to claim 4, wherein in response to that the configuration rate is a data rate of one channel, the data of the corresponding channel is received by each of the synchronization modules, the received data is synchronized, and the synchronized data is sent to a downstream receiving side.

6. The method according to claim 3, wherein in response to that the configuration rate is a sum of data rates of two channels, and the plurality of alignment modules receive the data of eight channels, the aligning, by at least one alignment module among the plurality of alignment modules, the synchronized data of all channels in the buffer module, and combining and outputting the aligned data comprises:
aligning, by the four first alignment modules, the synchronized data of eight channels corresponding to buffers of eight FIFOs in the buffer module, and combining and outputting the aligned data;

wherein each first alignment module is configured to align the synchronized data of two channels corresponding to buffers of two FIFOs in the buffer module, and combine and output the synchronized data of the two channels.

7. The method according to claim 3, wherein in response to that the configuration rate is a sum of data rates of four channels, and the plurality of alignment modules receive the data of eight channels, the aligning, by at least one alignment module among the plurality of alignment modules, the synchronized data of all channels in the buffer module, and combining and outputting the aligned data comprises:

aligning, by the two second alignment modules, the synchronized data of eight channels corresponding to buffers of eight FIFOs in the buffer module, and combining and outputting the aligned data;

wherein each second alignment module is configured to align the synchronized data of four channels corresponding to buffers of four FIFOs in the buffer module, and combine and output the synchronized data of the four channels.

8. The method according to claim 3, wherein in response to that the configuration rate is a sum of data rates of eight channels, and the plurality of alignment modules receive the data of eight channels, the aligning, by at least one alignment module among the plurality of alignment modules, the synchronized data of all channels in the buffer module, and combining and outputting the aligned data comprises:

aligning, by the third alignment module, the synchronized data of eight channels corresponding to buffers of eight FIFOs in the buffer module, and combining and outputting the synchronized data of the eight channels;

wherein the third alignment module is configured to align the synchronized data of the eight channels corresponding to the buffers of the eight FIFOs in the buffer module, and combine and output the synchronized data of the eight channels.

9. The method according to claim 3, wherein in response to that the configuration rate comprises a sum of data rates of four channels, and data rates of two channels, and the plurality of alignment modules receive the data of eight channels, the aligning, by at least one alignment module among the plurality of alignment modules, the synchronized data of all channels in the buffer module, and combining and outputting the aligned data comprises:

aligning, by one second alignment module, the synchronized data of the four channels corresponding to buffers of 4 FIFOs in the buffer module, aligning, by the two first alignment modules, the synchronized data of the four channels corresponding to buffers of the other 4 FIFOs in the buffer module, and combining and outputting the synchronized data.

10. The method according to claim 3, further comprising:

in response to that a time skew between the synchronized data of every two channels exceeds a set range, emptying, by the alignment module, the FIFO in the buffer module, and returning, by each synchronization module, the operation of receiving the data of the corresponding channel, synchronizing the received data, and storing the synchronized data into the buffer module.

* * * * *